United States Patent Office 2,892,869
Patented June 30, 1959

2,892,869

METHOD OF PRODUCING COMPOUNDS OF BORON AND NITROGEN

Stephen J. Groszos, Darien, and Stanley F. Stafiej, Stamford, Conn., assignors to American Cyanamid Company, New York, N.Y., a corporation of Maine No Drawing. Application March 25, 1957
Serial No. 647,934

5 Claims. (Cl. 260—551)

This invention relates to a method of producing certain compounds comprising boron and nitrogen, and more especially is concerned with a method of preparing a particular class of borazoles. Still more particularly, the invention relates to a new and improved method of producing borazoles represented by the general formula

I

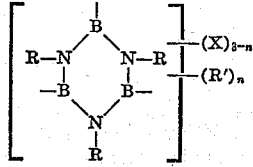

where X represents a halogen (e.g., chlorine, bromine, iodine), R represents a member of the class consisting of hydrogen and hydrocarbon radicals, R' represents a hydrocarbon radical, and $n$ represents a number from 1 to 3, inclusive. The preferred halogen represented by X is chlorine. Halogenoborazoles embraced by Formula I wherein X represents fluorine are not precluded, especially those fluoroborazoles which either are presently known or could be made by known methods. The hydrocarbon radicals represented by R and R' may be the same or different. For example, all of the radicals represented by R may be the same, and all those represented by R' may be the same, but the latter being different from those represented by R; or some of the radicals represented by R' may be different from each other and from some or all of those represented by R, which latter may be the same or different.

Briefly described, the method of the present invention comprises effecting reaction between (A) a halogenoborazole represented by the general formula

II

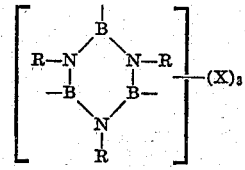

where R and X have the same meanings as given above with reference to Formula I, and (B) a compound represented by the general formula III M where $n$ and R' have the same meanings as given above with reference to Formula I, and M represents an alkali metal (e.g., sodium, potassium, lithium, rubidium, cesium). The number of moles represented by $n$ in Formula III can be more than 3, in which case there is present a molecular excess of the compound embraced by R'M. Preferably, the compounds of (A) and (B) are employed in a molar ratio of 1 mole of the former to at least 3 moles of the latter.

The reaction between the compounds of (A) and (B) is effected (as by contacting together) at a temperature of from about —75° C. (more particularly from about —15° C. to +30° C.) up to the boiling temperature of the reaction mass but below the temperature of decomposition of the reactants and of the borazole reaction product represented by Formula I; for example, the upper temperature in the aforementioned range may be +200° C., or even higher. In general, the temperature at which the reaction is effected is governed by the boiling points of the reactants. The reaction may be effected at atmospheric, sub-atmospheric or super-atmospheric pressure, and in the presence or absence of an essentially non-aqueous, more particularly anhydrous (substantially completely anhydrous), liquid medium which is inert during the reaction; that is, one which is inert (non-reactive) toward the reactants and the reaction product during the reaction period. By "substantially completely anhydrous" liquid medium is meant one which contains no more than a trace of water or the amount of water that might be present in the commercial product. Illustrative examples of such liquid media (solvents or diluents) are ethers, dioxane, aromatic and aliphatic hydrocarbons, chlorobenzene, etc.

When the number of moles of the compound R'M (Formula III), which number is represented by $n$ in that formula, is less than 3, then the reaction of the said compound with the B-trihalogenoborazole (B,B',B"-trihalogenoborazole) embraced by Formula II results in partial substitution of halogen atoms by hydrocarbon radicals (R') on the borazole ring, giving the B-mono-hydrocarbon-B',B"-dihalogenoborazoles and B,B'-dihydrocarbon-B"-monohalogenoborazoles as the main products. Some B,B',B"-trihydrocarbon-substituted borazole may also be formed and be present in the reaction mass, the amount thereof (in general) being the greater the more closely the number of moles of the compound represented by R'M approaches 3.

For certain purposes, and as shown by some of the examples which follow, the reaction mass containing the borazole reaction product can be used as such (e.g., in making other substituted borazoles) without isolating therefrom the borazole reaction product of the method. This practice often is advantageous when the substituted borazole of the method is one having an average of appreciably less than 3 (e.g., from ½ to 2½) unreacted halogen atoms per borazole ring present in the product, and the effective isolation of which might involve special, relatively expensive techniques. In other cases, more particularly when there are no halogen atoms attached to the borazole ring, the borazole reaction product is preferably isolated from the reaction mass, e.g., by separating the reaction product (as, for example, by filtration or centrifuging, if a solid, or by distillation, crystallization or other suitable means if other than a solid) from the inert, essentially non-aqueous liquid medium in which the reaction may have been effected. The separated borazole reaction product in crude state is then washed (e.g., with water or a mixture of water and alcohol, such as a 50–50 mixture thereof by volume) to remove the alkali-metal halide that is a by-product of the reaction.

Some of the substituted borazoles produced by the method of the present invention are new, while others are old.

Illustrative examples of hydrocarbon radicals represented by R and R', where they appear in the above formulas, are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, amyl, isoamyl, hexyl to octadecyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, etc.; phenyl, biphenylyl or xenyl, naphthyl, etc.; tolyl, xylyl, ethylphenyl, propylphenyl, isopropylphenyl, butylphenyl, allylphenyl, etc.; and vinyl, allyl, methallyl, propenyl, isopropenyl (β-allyl), 1-butenyl, 2-butenyl (crotyl), 3-butenyl, pentenyl, hexenyl, butadienyl, etc.

Specific examples of compounds embraced by the formula R'M, where R' and M have the same meanings given above, that can be reacted in accordance with the present invention with a halogenoborazole of the kind embraced by Formula II, are given in Tables 1 to 5, inclusive, of Rochow, Lewis and Hurd's "The Chemistry of Organometallic Compounds," published in 1957 by J. Wiley and Sons, Inc., New York, N.Y., and in the references cited in these tables. It will be noted that these tables include numerous examples of hydrocarbon-lithium, -sodium, -potassium, -rubidium and -cesium compounds and which can be used as a reactant with a halogenoborazole of the kind embraced by Formula II to yield a substituted borazole of the kind embraced by Formula I. These tables also show alkali-metal derivatives wherein the grouping attached to the alkali metal is other than a hydrocarbon radical and which likewise might be used in producing substituted borazoles in accordance with the general principles of the present invention.

Borazoles having aryl, alkyl and halogen substituents attached to the borazole ring are known. The better known compounds are those which are symmetrically substituted. Some of the synthetic routes by which they are obtained are outlined below:

IV

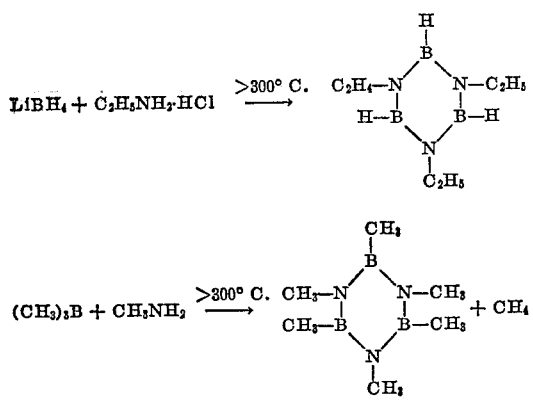

VI

VII

VIII

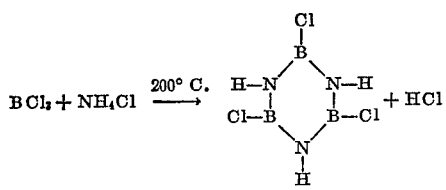

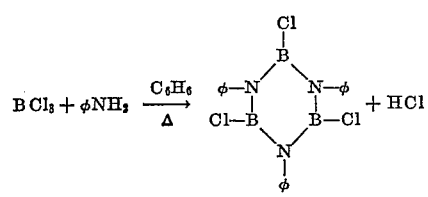

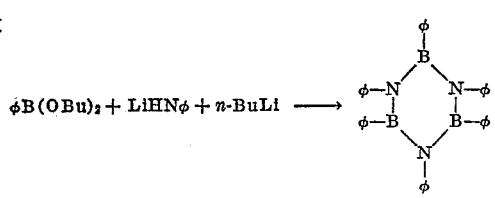

Another method involves the reaction of an aryl or alkyl boron dihalide with liquid ammonia or gaseous ammonia using benzene as a solvent. The two reactions that have been reported are illustrated by the following equations:

IX

X

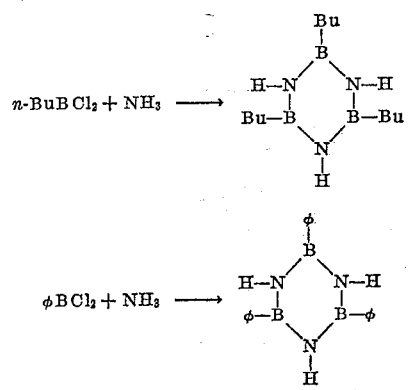

In the above formulas, as well as elsewhere herein, the symbol φ means $C_6H_5$.

All of the above methods share one common feature, viz.: substituents are "built onto" the borazole ring by a proper choice of the starting material. In many cases the prior methods have utilized vacuum-chain techniques, and the quantities of materials that could be produced were necessarily limited.

Halogenoborazoles are now known (see, for example, U.S. Patent No. 2,754,177 dated July 10, 1956), which fact has aided in advancing the art as represented by, for example, the present invention. The halogenoborazoles used in practicing our invention can be prepared as illustrated by the following equation in which, for purpose of simplicity only, borazole itself is shown as a starting reactant with 3 moles of a hydrogen halide (HX) to yield a trihalogenoborazole:

XI

The present invention provides a new and improved method of producing substituted borazoles, both symmetrical and unsymmetrical; and provides a less costly method than the prior methods of producing borazoles of the kind embraced by Formula I, as well as the production of new and useful borazoles.

In order that those skilled in the art may better understand how the present invention can be carried into effect, the following examples are given by way of illustration and not by way of limitation. All parts and percentages are by weight unless otherwise stated.

EXAMPLE 1

A. *Preparation of B,B',B''-trichloro-N,N',N''-triphenylborazole*

A three-necked, 500 ml. flask equipped with stirrer, Dry-Ice condenser and a Claisen head provided with a nitrogen inlet tube and a "Drierite" drying tube is charged with 200 ml. of toluene (freshly distilled over sodium or preferably calcium hydride) and cooled in an ice-water bath while being swept with dry nitrogen. Boron trichloride (50 g.; 0.43 mole; slightly more than one equivalent to take care of slight loss due to hydrolysis) is distilled into the flask through the Dry-Ice condenser, causing a brownish-purple color to develop in the toluene solution. After replacing the drying-tube with an addition funnel and protecting the exit of the condenser from moisture by a drying tube, a solution of aniline (30.4 g.; 0.326 mole) in toluene (100 ml.) is added dropwise with stirring over a one-hour period. An immediate precipitate of the addition compound ($C_6H_5$—$NH_2$:$BCl_3$) separates from the purple-colored solution. The cooling bath is replaced by a heating mantle; the Dry-Ice condenser is also replaced by a water condenser, the outlet of which is connected by a rubber tubing to an inverted funnel held about 4 cm. above a beaker of water. The reaction mixture is then refluxed until evolution of HCl and $BCl_3$ has ceased (24 hours). During this period the color of the solution changes from purple to a light brown. The solvent is slowly removed by distillation until the product begins to separate from solution. After allowing the mixture to cool to room temperature, the crystalline, almost colorless product is collected by rapid filtration. Yield: 32.6 g. (73%). A small portion recrystallized from dry benzene (filtered through glass wool) has M.P. 270°–272° C.; Jones and Kinney (J.A.C.S. 61, 1378 (1939)) report M.P. 265°–270° C. Since the compound is quite susceptible to hydrolysis by moisture, it should be protected from moisture, e.g., by storing in a desiccator over a suitable drying agent or in a container to which enough benzene or toluene is added to wet the solid.

B. *Preparation of phenyl lithium*

To a 250 ml., three-necked flask, equipped with stirrer, condenser to which a drying tube is attached at the outlet, and a Claisen head provided with a nitrogen inlet tube and a dropping funnel, is added 25 ml. of anhydrous benzene, followed by the addition of lithium metal (1.46 g.; 0.21 g. atom). A solution of bromo-benzene (15.7 g.; 0.1 mole) in dry ether (50 ml.) is added dropwise with stirring at such a rate as to maintain gentle reflux. After stirring at room temperature (20°–30° C.) for an additional hour, the brown reaction mass comprising a solution of phenyl lithium is transferred to another three-necked, 500 ml. flask (equipped exactly as the first reaction flask) through a filter stick by applying positive pressure in the original flask and a slight vacuum in the second flask.

C. *Preparation of hexaphenylborazole*

A suspension of B-trichloro-N-triphenylborazole (10.3 g.; 0.025 mole) in 100 ml. dry benzene and 200 ml. ether is added over a 45-minute period to the stirred phenyl lithium solution at room temperature (20°–30° C.). A very gentle exothermic reaction ensues, causing the separation of a finely divided solid and the development of a peach-colored supernatant solution. The quantity of solid and intensity of color increases with further addition of the chloroborazole. After refluxing for about 16 hours, the reaction mixture is cooled and the finely divided solid collected by filtration. During this operation the color of the collected solid turns purple while that of the filtrate is blood-red. Working up this filtrate in the usual manner furnishes a viscous red residue. The solid product comprising crude hexaphenylborazole is washed with hot water to remove LiCl, a by-product of the reaction. The resulting slightly pink, water-insoluble material, after air-drying, is recrystallized from chloroform to give 2.45 g. of purified hexaphenylborazole, M.P. >320° C. (Reported by H. G. Kuivala, Ph.D. Dissertation, Harvard University, 1948, M.P. 423° C.) Yield: 18%. Two further recrystallizations from chloroform furnishes the analytical sample.

*Analysis.*—Calc'd for $C_{36}H_{30}B_3N_3$: C, 80.50; H, 5.63; N, 7.83; B, 6.04; M.W. 540. Found: C, 80.43; H, 5.58; N, 7.75; B, 6.33; M.W. 541.9.

EXAMPLE 2

*Preparation of B,B',B''-tri-n-butylborazole*

XII

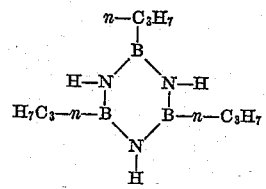

An ether solution of n-butyl lithium, prepared (in the manner described under Example 1–B for phenyl lithium) from 0.21 g. atom lithium metal and 0.1 mole n-butyl bromide, is added dropwise to a suspension of 0.25 mole of B,B',B''-trichloroborazole (B-trichloroborazole) in 200 ml. dry (anhydrous) benzene. The order of addition may be reversed, but addition of the lithium reagent to the B-trichloroborazole is preferred because of improved yields. The addition is carried out over a period of from about 15 minutes to 1 hour at from about —75° C. up to the reflux temperature of the reaction mass. The reaction mixture is then heated under reflux for 3 or 4 hours. After cooling to room temperature, the reaction mass is titrated very carefully with a saturated aqueous solution of ammonium chloride. The reaction mass is filtered through anhydrous sodium sulfate, the solvent (ether-benzene mixture) is removed in vacuo, and the residue distilled in vacuo to yield B,B',B''-tri-n-butylborazole (B-tri-n-butylborazole).

EXAMPLE 3

*Preparation of B,B',B''-trimethyl-N,N',N''-triphenylborazole*

Methyl lithium is prepared from 0.05 mole of methyl iodide and 0.1 mole lithium in 100 ml. of hexane. A suspension of 0.015 mole of B,B',B''-trichloro-N,N',N''-triphenylborazole (B-trichloro-N-triphenylborazole) in 100 ml. of anhydrous ethyl ether is added to the methyl lithium solution at about 0° C. over a 20-minute period. After refluxing the reaction mixture for one hour, and then cooling, a saturated solution of ammonium chloride is added until the organic solution becomes clear. The insoluble inorganic salts are separated by filtration, and the organic solution, after drying over anhydrous magnesium sulfate, is evaporated to dryness, leaving a nearly colorless, crystalline solid comprising B,B',B''-trimethyl-N,N',N''-triphenylborazole. Recrystallization from an ether-methanol mixture yields colorless, crystalline material of M.P. 267°–269° C.

Instead of using B-trichloro-N-triphenylborazole as described above, one can use an equivalent amount of B-tri-bromo-N-triphenylborazole.

EXAMPLE 4

*Preparation of B,B',B''-tri-(cyclohexyl)-N,N',N''-triphenylborazole*

An ether solution of cyclohexyl lithium is prepared from 0.1 mole cyclohexyl iodide and lithium metal (1.46 g.; 0.21 g. atom) in the form of lithium shot. This solution is then added to a benzene suspension of 0.03 mole of B-trichloro-N-triphenylborazole with stirring, the temperature of the reaction mixture being maintained at about 10°–15° C. After addition is complete, the ether is allowed to distill off and dry benzene added to replace the ether. This reaction mixture is then refluxed (heated under reflux at the boiling temperature of the mass) for about 8 hours. Shorter reflux periods, e.g., 1 to 7½ hours, or longer reflux periods, e.g., 8½ to 15 hours or longer, are not precluded. The product, B,B',B''-tri-(cyclohexyl)-N,N',N''-triphenylborazole, is isolated from the reaction mass in essentially the same manner described under Example 1.

EXAMPLE 5

*Preparation of B,B',B"-triallyl-N,N',N"-triphenylborazole*

Allyl sodium (0.1 mole) is prepared in the manner described in the literature by A. A. Morton and M. E. T. Holden, J. Am. Chem. Soc. 69, 1675 (1947); R. L. Letsinger and J. G. Traynham, J. Am. Chem. Soc., 70, 3342 (1948), and reacted with a suspension of 0.03 mole of B-trichloro-N-triphenylborazole in ether in the manner described in the previous examples. The product, B,B',B"-triallyl-N,N',N"-triphenylborazole (B-triallyl-N-triphenylborazole), is isolated via the usual method of titrating the unreacted allyl sodium with a saturated, aqueous solution of ammonium chloride, filtering through anhydrous sodium sulfate, concentrating the filtrate, adding methanol to the hot solution and allowing the solution to cool at room temperature. After cooling at 0°–5° C. for a half hour or longer, the B-triallyl-N-triphenylborazole is filtered off and air-dried; M.P. 95°–98° C. An ether-methanol mixture is employed as the recrystallizing solvent to give colorless crystals of the product; M.P. 98°–99° C'

EXAMPLE 6

*Preparation of B,B',B"-tri-n-dodecyl-N,N',N"-triphenylborazole* n-Dodecyl potassium (0.1 mole) is prepared essentially in accordance with the procedure described by Meals (J. Org. Chem., 9, 211 (1944)). A suspension of B-trichloro-N-triphenylborazole (0.03 mole) in 150 ml. anhydrous ether is added dropwise (over a one-hour period) with stirring at room temperature (20°–30° C.) to the n-dodecyl potassium. The reaction mixture is refluxed for 12 hours, after which it is cooled to room temperature and titrated with a saturated aqueous solution of ammonium chloride. The dry ether solution is then concentrated to a volume of ca. 200 ml., after which methanol is added until the crystalline product, B,B',B"-tri-n-dodecyl-N,N',N"-triphenylborazole, separates from solution. The precipitation is completed by storing in a refrigerator for several hours, and the product is then collected by filtration on a funnel cooled to 0° C.

EXAMPLE 7

*Preparation of B,B',B"-triphenyl-N,N',N"-tri-p-tolylborazole*

A suspension of B-trichloro-N-tri-p-tolylborazole (0.05 mole) in benzene at about 20°–30° C. (prepared according to the procedure of Kinney and Mahoney, J. Org. Chem., 8, 526 (1943)) is added to a solution of phenyl lithium (0.15 mole) in benzene at 20°–30° C. over a one-hour period. The reaction mixture is refluxed for 12 hours and, after cooling to room temperature, the benzene-insoluble material is collected by filtration and extracted continuously with chloroform in a Soxhlet apparatus. Concentration of the slightly colored chloroform solution and cooling to room temperature yields a nicely crystalline product comprising B,B',B"-triphenyl-N,N',N"-tri-p-tolylborazole. The compound is purified by recrystallizing from chloroform or chlorobenzene after clarifying with decolorizing carbon.

Instead of using B-trichloro-N-tri-p-tolylborazole as described above, one can substitute an equivalent amount of B-triiodo-N-tri-p-tolylborazole.

EXAMPLE 8

*Preparation of B,B',B"-tribenzyl-N,N',N"-triphenylborazole*

XIII

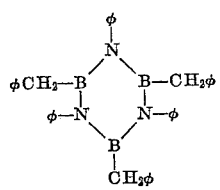

An ether solution of benzyl lithium is prepared in the usual manner from 0.1 mole benzyl bromide and lithium shot (1.46 g.; 0.21 g. atom). This is then added dropwise with stirring to 0.025 mole of B-trichloro-N-triphenylborazole suspended in benzene, and essentially the same procedure is followed as is described in Examples 3–6 to yield, in this case, B,B',B"-tribenzyl-N,N',N"-triphenylborazole (B-tribenzyl-N-triphenylborazole).

EXAMPLE 9

*Preparation of unsymmetrical borazoles*

A. To a suspension of 41.2 g. (0.1 mole) of B-trichloro-N-triphenylborazole in benzene at 20°–30° C. is added 0.1 mole phenyl lithium in ether solution over a period of about one hour. The resulting mixture, after refluxing for about one hour, contains the reactive intermediate N-triphenyl-B-phenyl-B',B"-dichloroborazole,

XIV

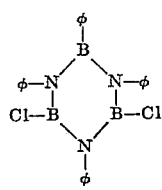

B. To the cooled (about 20°–30° C.) reaction mixture from (A), 0.1 mole of methyl lithium in ether solution is added dropwise over a period of about one hour, and the resulting reaction mixture is refluxed for about one hour. This contains the reactive intermediate, N-triphenyl-B-phenyl-B'-methyl-B"-chloroborazole.

C. To the partly cooled reaction mixture from (B) is added 0.1 mole of allyl sodium (prepared as in Example 5) over a period of about one hour, and refluxing is continued for an additional hour. The reaction mixture is titrated with a saturated, aqueous solution of ammonium chloride, and then worked up as in Example 5 to give the unsymmetrically substituted compound, N-triphenyl-B-phenyl-B'-methyl-B"-allylborazole,

XV

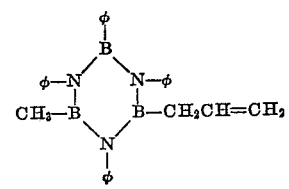

The substituted borazoles produced by the method of this invention range from liquids to semi-solids and solids in normal state. They are useful, for instance, as components of flame-resisting compositions; as plasticizers; as fuel additives; as scintillation counters; as the active ingredient in insecticides, bactericides, germicides, fungicides, pesticides and the like; as a chemical intermediate for use in the preparation of other compounds; as a component of arc-extinguishing tubes, and especially of surfaces that are exposed to the action of the arc. Other uses include: as rocket fuels or as components of such fuels; as polymer additives to impart neutron-absorbing properties to the polymer to which it is added and to improve the thermal stability of the polymer; as heat-exchange media or as modifiers of such media whereby they can be used at higher temperatures; as petroleum additives which are hydrolytically stable (e.g., viscosity-index improvers, lubricants and greases for high-temperature applications, cetane improvers, ignition promoters, anti-knock agents, preventives of pre-ignition, etc.); and in making new types of dyes and pigments. Some of them, for instance those containing reactive hydrogen or polymerizable groups, are also useful as cross-linking agents in resinous compositions.

The homopolymerizable and/or copolymerizable substituted borazoles produced by the method of this invention can be employed alone or in combination with other substances that are copolymerizable therewith to yield new synthetic materials (homopolymers and copolymers) having particular utility in the plastics and coating arts. An example is the homopolymerization of B,B',B''-triallyl-N,N'-N''-triphenylborazole (compound of Example 5), for instance as follows:

Ten (10) parts of B,B',B''-triallyl-N,N',N''-triphenylborazole is dissolved in 90 parts of benzene (in which it is very soluble), and about 0.3 part of a 75% solution of pinane hydroperoxide in pinane is added thereto. The mixture is agitated to obtain a homogeneous solution, after which a portion is cast on a glass plate. The coated plate is placed in an oven maintained at about 150° C. After about 6 hours at this temperature homopolymerization of the monomer is evident. The resulting film of polymer is insoluble in benzene, which is a good solvent for the monomer.

B,B',B''-trially-N-N',N''-triphenylborazole is claimed specifically and generically, as a new compound, in our copending application Serial No. 647,936, filed concurrently herewith, and which was abandoned in favor of application Serial No. 716,542, filed February 21, 1958, as a continuation-in-part of said application Serial No. 647,936 and copending applications, Serial Nos. 647,934 and 647,935, each filed March 25, 1957.

In any of the aforementioned and other applications or uses, one can employ a single compound of the kind embraced by Formula I or a plurality of such compounds in any proportions. They can be used in conjunction with any of the conventional componets of flame-resistig compositions, plasticizers, insecticides, bactericides, germicides, fungicides, pesticides, and other compositions hereinbefore mentioned by way of illustrating the fields of utility, generically and specifically, of the substituted borazoles produced by the method of this invention.

Instead of using a hydrocarbon derivative of an alkali metal (R'M in Formula III) as a reactant (coupling agent) with a halogenoborazole of the kind embraced by Formula II, one may use an equivalent amount of a compound represented by the formula XVI

where R'' and R''' each represents a hydrocarbon radical that may be the same or different, and M' represents a metal of group II of the periodic table of the elements, and more specifically beryllium, magnesium, calcium, strontium and barium of group IIA and zinc, cadmium and mercury of group IIB. Examples of compounds embraced by Formula XVI are:

Dimethyl beryllium
Diethyl beryllium
Diphenyl beryllium
Diethyl magnesium
Diphenyl magnesium
Diethyl strontium
Diphenyl barium
Di-n-butyl barium
Dimethyl zinc
Diphenyl zinc
Diethyl cadmium
Dimethyl cadmium
Di-(hydrocarbon)mercurys ($R_2Hg$), numerous examples of which are given in F. C. Whitmore's "Organic Compounds of Mercury"; Chemical Catalog Company, New York, 1921

For further information concerning compounds embraced by Formulas III and XVI and additional examples, thereof see, for instance, G. E. Coates, "Organo-metallic Compounds," Methuen and Co., Ltd., London, 1956; and E. Krause and A. von Grosse, "Die Chemie der Metallorganischen Verbindungen," Berlin, 1937.

In our copending application Serial No. 647,937, filed March 25, 1957, claims are made to chemical compounds represented by the general formula

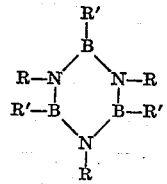

where R represents an aryl radical selected from the class consisting of phenyl, biphenylyl and naphthyl radicals and R' represents an alkyl radical containing from 3 to 26 carbon atoms, inclusive. In our copending application Serial No. 647,938, filed March 25, 1957, and now abandoned in favor of application Serial No. 748,822, filed July 16, 1958, as a continuation-in-part, and application Serial No. 744,077, filed June 24, 1958, as a division, of the afore said application Serial No. 647,938. In application Serial No. 748,822, a claim is made to B-triphenyl-N-trimethylborazole per se; and in application Serial No. 744,077 claims are made to particular compositions containing B-trimethyl-N-triphenylborazole, or B-triphenyl-N-trimethylborazole, or a mixture thereof.

We claim:

1. A method of producing borazoles represented by the general formula

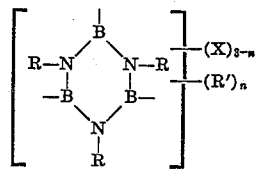

where X represents a halogen, R represents a member of the class consisting of hydrogen and hydrocarbon radicals, R' represents a hydrocarbon radical, and $n$ represents a number from 1 to 3, inclusive, said method comprising effecting reaction between ingredients consisting essentially of (A) a halogenoborazole represented by the general formula

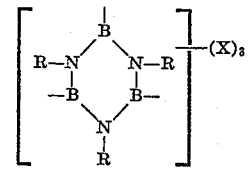

where R and X have the same meanings as given above and (B) a compound represented by the general formula $n$R'M where $n$ and R' have the same meanings as given above, and M represents an alkali metal, the reaction between the compounds of (A) and (B) being effected under substantially completely anhydrous conditions and at a temperature of from about −75° C. up to the boiling temperature of the reaction mass but below the temperature of decomposition of the reactants and of the borazole reaction product represented by the above formula.

2. A method as in claim 1 wherein the reaction between the compounds of (A) and (B) is effected in the presence of an inert, substantially completely anhydrous, liquid medium.

3. A method of producing borazoles represented by the general formula

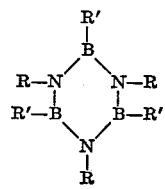

where R represents a member of the class consisting of hydrogen and hydrocarbon radicals, and R' represents a hydrocarbon radical, said method comprising effecting reaction between ingredients consisting essentially of (A) a halogenoborazole represented by the general formula

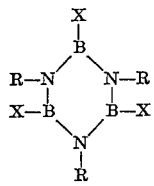

where X represents a halogen and R has the same meaning as given above and (B) a compound represented by the general formula

R'M where R' has the same meaning as given above, and M represents an alkali metal, the compounds of (A) and (B) being employed in a molar ratio of 1 mole of the former to at least 3 moles of the latter and the reaction between the said compounds being effected under substantially completely anhydrous conditions and at a temperature of from about $-75°$ C. up to the boiling temperature of the reaction mass but below the temperature of decomposition of the reactants and of the borazole reaction product represented by the above formula; and isolating from the resulting reaction mass a borazole embraced by the first-given formula.

4. A method as in claim 3 wherein R'M represents a hydrocarbon-lithium.

5. A method of preparing hexaphenylborazole which comprises effecting reaction in an anhydrous liquid medium and at a temperature ranging between about 20° C. and the reflux temperature of the reaction mass, between (1) B,B',B''-trichloro-N,N',N''-triphenylborazole and (2) phenyl lithium, the compounds of (1) and (2) being employed in a molar ratio of 1 mole of the former to at least 3 moles of the latter; and isolating hexaphenylborazole from the resulting reaction mass.

No references cited.

UNITED STATES PATENT OFFICE

CERTIFICATE OF CORRECTION

Patent No. 2,892,869                          June 30, 1959

Stephen J. Groszos et al.

It is hereby certified that error appears in the printed specification of the above numbered patent requiring correction and that the said Letters Patent should read as corrected below.

Column 3, line 33, formula IV, for the left-hand portion reading "$C_2H_4-N$" read -- $C_2H_5-N$ --; column 6, line 73, for "$-N,N',N'',-$" read -- $-N,N',N''-$ --; column 7, line 22, for "98°-99° C'" read -- 98°-99° C.--; column 9, line 18, for "-trially-" read -- -triallyl- --; line 30, for "componets" read -- components --; line 31, for "flame-resistig" read -- flame-resisting --; column 10, line 20, for "afore said" read -- aforesaid --.

Signed and sealed this 23rd day of February 1960.

(SEAL)
Attest:

KARL H. AXLINE                                      ROBERT C. WATSON
                                                               Commissioner of Patents
Attesting Officer